(12) United States Patent
Fujimori et al.

(10) Patent No.: US 6,500,915 B1
(45) Date of Patent: Dec. 31, 2002

(54) POLYESTER RESIN AND ITS PRODUCTION PROCESS

(75) Inventors: Yoshihiro Fujimori, Yokkaichi (JP); Shuuji Anno, Yokkaichi (JP); Masahiro Nukui, Yokkaichi (JP)

(73) Assignee: Mitsubishi Chemical Corporation, Tokyo (JP)

(*) Notice: Subject to any disclaimer, the term of this patent is extended or adjusted under 35 U.S.C. 154(b) by 74 days.

(21) Appl. No.: 09/709,250

(22) Filed: Nov. 10, 2000

(30) Foreign Application Priority Data

| Nov. 11, 1999 | (JP) | 11-321127 |
| Nov. 11, 1999 | (JP) | 11-321128 |
| May 1, 2000 | (JP) | 2000-131994 |
| May 1, 2000 | (JP) | 2000-131999 |

(51) Int. Cl.⁷ .............................................. C08G 63/78
(52) U.S. Cl. ..................... 528/279; 528/275; 528/277; 528/283; 528/286; 528/298; 528/308; 528/308.6; 528/499; 528/503
(58) Field of Search ................ 528/275, 277, 528/279, 283, 286, 298, 308, 308.6, 499, 503

(56) References Cited

U.S. PATENT DOCUMENTS 5,241,046 A * 8/1993 Shiraki et al. ........... 528/308.2
5,519,018 A 5/1996 Yuo et al. ................ 528/287

FOREIGN PATENT DOCUMENTS

| EP | 699700 A2 | 8/1995 |
| EP | 699700 A3 | 8/1995 |
| EP | 1013692 A2 | 6/2000 |
| EP | 1043362 A1 | 10/2000 |
| JP | 62207325 A | 3/1986 |
| JP | 08188704 A | 1/1995 |
| JP | 08283393 A | 4/1995 |
| JP | 09087374 A | 9/1995 |
| JP | 2000143789 A | 11/1998 |

OTHER PUBLICATIONS

European Search Report.

* cited by examiner

Primary Examiner—Samuel A. Acquah
(74) Attorney, Agent, or Firm—David G. Conlin; John B. Alexander; Edwards & Angell, LLP

(57) ABSTRACT

The present invention relates to a polyester resin produced by polymerizing a dicarboxylic acid component comprising mainly an aromatic dicarboxylic acid or its ester forming derivative, and a diol component comprising mainly ethylene glycol in the presence of a catalyst containing a titanium compound, which polyester resin contains titanium atoms (Ti) in an amount of 0.002 to 1.0 mole based on one ton of the polyester resin and has the following properties:

Intrinsic viscosity ($[\eta]$, dl/g)$\geq$0.70

Hunter's "b" value$\leq$4

Acetaldehyde content ($AA_0$, ppm)$\leq$5.0.

21 Claims, 1 Drawing Sheet

POLYESTER RESIN AND ITS PRODUCTION PROCESS

BACKGROUND OF THE INVENTION

The present invention relates to polyester resins, such as polyethylene terephthalate, which are widely used for various types of packaging containers, films, fibers or the like. More particularly, it relates to polyester resins produced by using inexpensive and environmentally safe titanium as a component of the polycondensation catalyst, said resins having an excellent color tone and melting heat stability, forming few by-products in their production, excellent transparency and especially suited for molding bottles and the like.

Polyester resins such as polyethylene terephthalate are excellent in many properties such as mechanical strength, chemical stability, gas barrier properties and hygienic qualities and are also light in weight, so that they are popularly used for various kinds of packaging containers, films, fibers, etc.

Such polyester resins have been produced mostly by using an antimony compound as polycondensation catalyst.

However, the polyester resins polymerized by using an antimony compound as polycondensation catalyst, when for instance molded into a container for a drink or food and put to practical use as such, have a probability that antimony remaining in the resin might be eluted out from the container when placed under a high temperature and transfer, if small in quantity, into the drink or food in the container. Use of antimony, which is a heavy metal, also poses the problem of environmental pollution. Thus, use of very scanty amount of antimony compound even though using thereof for the production of polyester resins or preferably use of a more safe metal as catalyst (antimony-free catalyst) for the production of polyester resins has been desired. The obtained molded containers cannot necessarily show a sufficient transparency and, therefore, frequently failed to meet the requirements of the market.

Polyester resins polymerized by using a germanium compound instead of an antimony-containing catalyst are also known. Germanium compounds, however, are very expensive because of scanty reserves, so that the development of a catalyst that can substitute for such costly compounds has been required. When such a polyester is blow-molded, a blowing mold used therefor tends to be contaminated, so that the obtained molded containers are deteriorated in surface smoothness and transparency. In addition, there also arises such a problem that the yield of these containers is considerably deteriorated due to necessity of additional steps for cleaning the contaminated mold.

On the other hand, it is considered that the mold contamination is caused by the transfer of by-products such as cyclotrimethylene terephthalate (cyclic trimer) which are produced upon forming a preform by injection-molding the resin and contained in the molded preform, onto the surface of the blowing mold when subjecting the cyclic trimer or the like to stretch blow molding. Consequently, for the purpose of inhibiting the generation of such by-products upon forming the preform by injection-molding method, for example in Japanese Patent Publication (KOKOKU) No. 7-37515 (1995), there has been proposed the method of deactivating a catalyst contained in the resin by contacting the polycondensed resin with hot water heated to a temperature of 50 to 100° C. However, as a result of the present inventors' studies, it has been found that the step of contacting the polycondensed resin with hot water is required thereby increasing the production cost of polyester, and molded products obtained by the above conventional method exhibit a considerably poor transparency. Further, it is suggested that the poor transparency of the molded products is caused by not the above-described mold contamination but deterioration in quality of the resin itself.

Various types of polyester resins polymerized by using an inexpensive and safe titanium compound have also been proposed. The titanium catalyst can be used in a small amount as compared to antimony and germanium catalysts due to its high catalytic activity, and is free from problems concerning safety unlike the antimony catalyst, and inexpensive as compared to the germanium catalyst. Therefore, it is considered industrially valuable to study and develop a polyester resin produced by processes using these titanium catalysts. However, polyester resins obtained by the polymerization using such titanium catalysts exhibit a yellowish color, and are deteriorated in thermal stability since these resins undergoes a significant discoloration after heating.

In Japanese Patent Application Laid-Open (KOKAI) No. 8-73581 (EP-A-0699700), an antimony-free, colorless high-transparency polyester produced by using specified amounts of a complex forming agent and a titanium compound has been proposed. According to the follow-up tests conducted by the present inventors, however, it was found that the polyester resin obtained by the method described in the above patent contained large quantities of such by-products as acetaldehyde and cyclic trimers, and had the problem that, when molded into a food container such as a bottle, the obtained bottle might affect the savor of the content, or the mold used for bottle molding could be excessively stained.

Further, in the process according to the above reference, cobalt which is a heavy metal and used as bluish agent is used in order to improve the color tone. However, in view of environmentally safe, it is desired that cobalt which is a heavy metal is not used.

As a result of the present inventors' earnest studies to solve the above problem, it has been found that by using environmentally safe and inexpensive titanium as a polycondensation catalyst constituent and by selecting the optimal catalyst components and amount thereof and polycondensation conditions, the above problem can be solved.

The present invention has been attained on the basis of the above finding.

SUMMARY OF THE INVENTION

The object of the present invention is to provide a polyester resin in which titanium with high environmental safety is used as a component of the polycondensation catalyst, the resin shows excellent color tone and melting heat stability and forms few by-products such as acetaldehyde and cyclic trimers in the course of its production, and that therefore when the resin is molded into a food container such as a bottle, the produced bottle won't affect the savor of its content, and the mold used for bottle molding is scarcely stained.

To attain the above aim, in the first aspect of the present invention, there is provided a polyester resin produced by polymerizing a dicarboxylic acid component comprising mainly an aromatic dicarboxylic acid or its ester forming derivative, and a diol component comprising mainly ethylene glycol in the presence of a catalyst containing a titanium compound, which polyester resin contains titanium atoms (Ti) in an amount of 0.002 to 1.0 mole based on one ton of the polyester resin and has the following properties:

Intrinsic viscosity ($[\eta]$, dl/g) $\geqq 0.70$

Hunter's "b" value $\leqq 4$

Acetaldehyde content ($AA_0$, ppm) $\leqq 5.0$

In the second aspect of the present invention, there is provided a polyester hollow container molded by using a polyester resin according to the first aspect.

In the third aspect of the present invention, there is provided a process for producing a polyester resin which comprises polymerizing a dicarboxylic acid component comprising mainly an aromatic dicarboxylic acid and a diol component comprising mainly ethylene glycol in the presence of a catalyst containing (1) a titanium compound, (2) a phosphorus compound and (3) at least one compound selected from compounds of Ia-Group metals except for hydrogen, IIa-Group metal compounds and manganese compounds, said compounds (1) to (3) being added to the reaction system in the order of (2), (3) and (1).

DETAILED DESCRIPTION OF THE INVENTION

Figure 1:
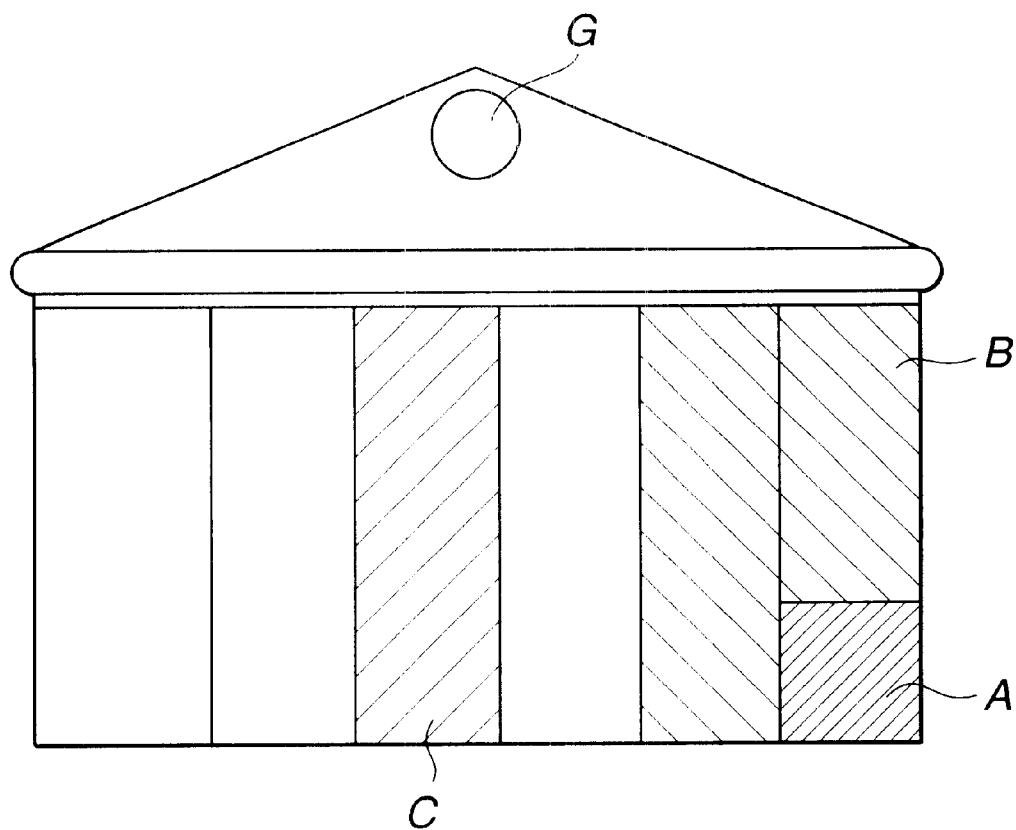
FIG. 1 is a plan of the stepped molded plate used in the Examples.
Figure 2:
FIG. 2 is a front view of the stepped molded plate of FIG. 1.

The present invention is described in detail below.

The polyester resin of the present invention can be produced by first preparing a slurry of an aromatic dicarboxylic acid or its ester forming derivative component and a diol component, subjecting this slurry to direct esterification or transesterification to obtain a low-molecular weight polyester, polycondensing this low-molecular weight polyester by subjecting it to melt polymerization in the presence of a catalyst containing a titanium compound, and if necessary further subjecting the polycondensate to solid phase polymerization, fundamentally all according to the conventional methods. The polyester resin of the present invention contains a titanium compound used as a polymerization catalyst and a metal component originating in the optionally used co-catalyst or promoter and has the prescribed property values which are provided by controlling the amount or addition method of the metal component used and the polymerization reaction conditions.

The polyester resin according to the present invention is produced from the aromatic dicarboxylic acid or its ester forming derivative which is the main constituent of the dicarboxylic acid moiety and ethylene glycol which is the main constituent of the diol moiety.

As the aromatic dicarboxylic acid or its ester forming derivative, there can be used, for example, such aromatic dicarboxylic acids as terephthalic acid, phthalic acid, isophthalic acid, dibromoisophthalic acid, sodium sulfoisophthalate, phenylenedioxydicarboxylic acid, 4,4'-diphenyldicarboxylic acid, 4,4'-diphenyletherdicarboxylic acid, 4,4,-diphenylketonedicarboxylic acid, 4,4'-diphenoxyethanedicarboxylic acid, 4,4'-diphenylsulfonedicarboxylic acid, 2,6-naphthalenedicarboxylic acid, and their lower alkyl esters ("lower" means having about 1 to 4 carbon atoms in the molecule), for example, dimethyl terephthalate and 2,6-naphthalenedicarboxylic acid dimethyl esters, and their halides.

As the dicarboxylic acid moiety, beside the aromatic dicarboxylic acids and their lower alkyl esters mentioned above as main constituent, there can also be used alicyclic dicarboxylic acids such as hexahydroterephthalic acid and hexahydroisophthalic acid, aliphatic dicarboxylic acids such as succinic acid, glutaric acid, adipic acid, piperic acid, suberic acid, azelaic acid, sebacic acid, undecanedicarboxylic acid and dodecanedicarboxylic acid, and their lower alkyl esters and halides.

As the diol moiety, beside ethylene glycol comprising the main component, there can be also used aliphatic glycols such as trimethylene glycol, tetramethylene glycol, pentamethylene glycol, hexamethylene glycol, octamethylene glycol, decamethylene glycol, neopentyl glycol, propylene glycol, diethylene glycol, triethylene glycol, polyethylene glycol and polyoxytetramethylene glycol. It is also possible to use alicyclic glycols such as 1,2-cyclohexanediol, 1,4-cyclohexanediol, 1,1-cyclohexanedimethanol, 1,4-cyclohexanedimethanol and 2,5-norbornenedimethanol, branched aliphatic glycols such as neopentyl glycol and 2-butyl-2-ethyl-1,3-propanediol, aromatic glycols such as xylylene glycol, 4,4'-dihydroxybiphenyl, 2,2-bis(4'-hydroxyphenyl)propane, 2,2-bis(4'-β-hydroxyethoxyphenyl)propane, bis(4-hydroxyphenyl)sulfone, 4,4,'-bis(2-hydroxyethoxy)diphenylsulfone and ethylene oxide and propylene oxide adducts of 2,2-bis(4-hydroxyphenyl)propane.

The polyester resin of the present invention may contain, beside the said dicarboxylic acid and diol components, a small quantity of a hydroxycarboxylic acid or alkoxycarboxylic acid such as glycolic acid, p-hydroxybenzoic acid, p-β-hydroxyethoxybenzoic acid, monofunctional substance such as stearic alcohol, docosanol, octacosanol, benzyl alcohol, stearic acid, behenic acid, melissic acid, benzoic acid, t-butylbenzoic acid, or benzoilbenzoic acid, a polyfunctional (tri- or higher functional) substance such as tricarballylic acid, trimellitic acid, trimesic acid, pyromellitic acid, gallic acid, trimethylolethane, trimethylolpropane, glycerin, pentaerithrytol and tetrakis[methylene-3-(3',5'-di-t-butyl-4'-hydroxyphenyl)propyonate]methane.

The present invention is especially advantageously embodied as a polyester produced from a carboxylic acid component comprising mainly terephthalic acid or 2,6-napthalenedicarboxylic acid, preferably terephthalic acid, and a diol component comprising mainly ethylene glycol, and this embodiment can maximize the effect of the present invention.

The polyester resin of the present invention is produced by esterifying or transesterifying the dicarboxylic acid component containing the above aromatic dicarboxylic acid or ester-forming derivatives thereof, in an amount of not less than 50 mol %, preferably not less than 90 mol %, more preferably not less than 95 mol %, especially preferably not less than 99 mol % based on the dicarboxylic acid component, with the diol component containing ethylene glycol in an amount of not less than 50 mol %, preferably not less than 90 mol %, more preferably not less than 95 mol %, most preferably not less than 99 mol % based on the diol component, and then subjecting the esterification products or transesterification products to polycondensation reaction. Meanwhile, the polyester resin may contain diethylene glycol units by-produced in the reaction system and copolymerized therewith. The content of the diethylene glycol units in the polyester resin which include those externally added to the reaction system is usually not more than 4 mol %, preferably not more than 3 mol %. When the amount of diethylene glycol is too large, the polyester resin may be poor in melt heat stability and the molded product such as a bottle by using the polyester resin may be poor in heat resistance.

The polyester resin of the present invention is polymerized in the presence of a catalyst comprising a titanium compound and contains titanium originating in the catalyst.

Examples of the titanium compounds usable as catalyst in the present invention include, for example, tetra-n-propyl titanate, tetraisopropyl titanate, tetra-n-butyl titanate, tetra-t-butyl titanate, tetraphenyl titanate, tetracyclohexyl titanate, tetrabenzyl titanate, tetra-n-butyl titanate tetramer, titanium acetate, titanium oxalate, potassium titanate oxalate, sodium titanate oxalate, potassium titanate, sodium titanate, titanic acid-aluminum hydroxide mixture, titanium chloride, titanium chloride-aluminum chloride mixture, titanium bromide, titanium fluoride, potassium titanate hexafluoride, manganese titanate hexafluoride, ammonium titanate hexafluoride, and titanium acetylacetate. Of these titanium compounds, tetra-n-propyl titanate, tetraisopropyl titanate, tetra-n-butyl titanate, titanic acid oxalate and potassium titanate oxalate are preferred.

In the present invention, a titanium compound is used in such an amount that will make the titanium atom (Ti) content 0.002 to 1.0 mole based on one ton of the polyester resin produced.

If the titanium atom content is less than 0.002 mole based on one ton of the polyester resin, no satisfactory polymerization rate may be obtained. A titanium atom content exceeding 1.00 mole may be also undesirable because it may give adverse effect to the color tone and melting heat stability of the obtained polyester resin. The preferred amount of titanium compound is such that the titanium atom content becomes 0.002 to 0.5 mole, preferably 0.002 to 0.2 mole, more preferably 0.002 to 0.06 mole, even more preferably 0.002 to 0.04 mole, based on one ton of the polyester resin.

The polyester resin of the present invention has the following properties:

Intrinsic viscosity ($[\eta]$, dl/g)$\geq$0.70

Hunter's "b" value$\leq$4

Acetaldehyde content ($AA_0$, ppm)$\leq$5.0

Intrinsic viscosity of the polyester resin of the present invention is not less than 0.70 dl/g, preferably 0.70 to 1.5 dl, more preferably 0.70 to 0.90 dl/g, even more preferably 0.70 to 0.80 dl/g. In the present invention, intrinsic viscosity was determined by freeze grinding the polyester resin, dissolving it in a 1/1 (by weight) mixed solvent of phenol and 1,1,2,2,-tetrachloroethane to prepare the solutions with concentrations of 0.1 g/dl, 0.2 g/dl, 0.5 g/dl and 1 g/dl, measuring viscosity of each solution by an Ubbellohde capillary tube viscometer at 30° C., and determining a viscosity at the concentration of 0 g/dl (intrinsic viscosity) by the extrapolation of the linear viscosity vs. concentration plot. When the intrinsic viscosity is too small, the molded product using the polyester resin such as a bottle may be poor in strength. When the intrinsic viscosity is too large, a large time is required for melting the polyester resin in the injection molding process for a pre-molded product for a bottle etc., thereby arising problems that the amount of by-products such as acetaldehyde and cyclic trimer increase and the productibility of molded product is deteriorated because the large stretch tension is required when the pre-molded product is subject to stretch-blow operation to form a bottle.

Intrinsic viscosity can be adjusted to the above preferred level according to the purpose of use of the produced polyester resin by controlling the working conditions such as temperature and time of the melt polymerization in the production of polyester and if necessary the succeeding crystallization and solid phase polymerization. For instance, when intrinsic viscosity is controlled as 0.10 to 0.70 dl/g, preferably 0.30 to 0.70 g/dl, more preferably 0.50 to 0.65 dl/g by melt polymerization and then made more than 0.70 dl/g by crystallization and solid phase polymerization, there can be obtained a polyester resin which is preferable in color tone, polymerization rate and formation of by-product cyclic oligomers.

In the color tone of the polyester resin of the present invention, the "b" value of Hunter's color coordinates in Lab color system according to reference 1 in JIS Z8730 is not more than 4, preferably −10 to 3, more preferably −5 to 2, even more preferably −3 to 1, most preferably −2 to 0. When the "b" value is not greater than 4, the molded product of the resin has a good hue of color, but when the "b" value exceeds 4, the molded product tends to have a strong yellowish tinge, while when the "b" value is below −10, the molded product tends to have a strong bluish tinge.

The "b" value can be adjusted by changing the polymerization conditions or the type of the catalyst used. The "b" value can also be adjusted by adding a coloring material (dye) to the polymerization system, but this is unrecommendable because it may stain the polymerization equipment, molding equipment and other working means.

The acetaldehyde content ($AA_0$, ppm) of the polyester resin according to the present invention is not more than 5.0 ppm, preferably not more than 3.0 ppm, more preferably not more than 2.0 ppm. When the acetaldehyde content exceeds 5.0 ppm, the molded product of the resin (such as food container) is liable to greatly affect the savor of the content. The unit "ppm" used in the present invention is by weight.

The cyclic trimer content ($CT_0$, wt %) of the polyester resin of the present invention is not more than 0.50 wt %, preferably not more than 0.40 wt %. When the cyclic trimer content exceeds 0.50 wt %, the cyclic trimer may adhere to and stain the mold in the molding operation to impair appearance of the molded product. The molding productivility is also reduced because of the necessity of cleaning the mold.

Further, in the polyester resin according to the present invention, it is preferred that the generation of by-products is prevented in the molding process. Especially, since the formation of cyclic trimers in molding process is prevented, the mold-contamination property can be remarkably improved.

In the polyester resin of the present invention, it is preferable that the difference between the cyclic trimer content ($CT_s$, wt %) of the resin in the molded product after injection molding at 280° C. and the cyclic trimer content ($CT_0$, wt %) of the resin before injection molding ($CT_s-CT_0$) is not more than 0.10 wt %, preferably not more than 0.05 wt %, more preferably not more than 0.03 wt %. When the difference ($CT_s-CT_0$) is outside the above-defined range, there may be a tendency that the mold is stained in the molding operation.

Further, in the polyester resin of the present invention, the crystallizing temperature in temperature lowering mode (Tc) of the resin in the molded product after injection molding at 280° C. is preferably not higher than 180° C., more preferably not higher than 175° C., even more preferably not higher than 170° C. When the crystallizing temperature in temperature lowering mode of the resin is outside the above-defined range, the molded product tends to lack transparency. The crystallizing temperature in temperature lowering mode is the peak temperature of crystallization determined in the following way. Using a differential scanning calorimeter, the sample was heated from 20° C. to 285° C. at a rate of 20° C./min in a nitrogen atmosphere, and after maintaining the molten state of the resin at 285° C. for 3 minutes, the temperature was lowered to 20° C. at a rate of 10° C./min, determining the peak temperature of crystallization observed in the course of temperature descent.

For the polyester resin of the present invention, it is also preferable that the difference between the acetaldehyde content ($AA_S$, ppm) of the resin in the molded product after injection molding at 280° C. and the acetaldehyde content ($AA_O$, ppm) of the resin before injection molding ($AA_S - AA_O$) is not more than 20 ppm, preferably not greater than 17 ppm, more preferably not more than 15 ppm. When this difference ($AA_S - AA_O$) is outside the above-defined range, there tends to arise the problem that in case where the resin is used as a material for packaging a drink or food, the packaging material may impair the savor of the packaged drink or food.

The said properties of the polyester resin can be adjusted by using a titanium polymerization catalyst with a suitable co-catalyst or promotor. In this case, the polyester resin of the present invention contains a substance originating in the co-catalyst or promotor.

Specifically, in a preferred embodiment of the invention, catalyst system comprises a titanium compound, appropriate amounts of (1) a phosphorus compound and (2) at least one compound selected from compounds of Ia-Group metals except for hydrogen, IIa-Group metal compounds and manganese compounds.

As the phosphorus compound (1), there can be used trivalent phosphorous compounds such as phosphorous acid, hypophosphorous acid, their esters (such as diethyl phosphite, triphenyl phosphite, trisdodecyl phosphite and trisnonyldecyl phosphite), and metal (lithium, sodium, potassium, etc.) salts of said acids.

It is also possible to use pentavalent phosphoric compounds such as orthophosphoric acid, polyphosphoric acid, their esters (such as trimethyl phosphate, triethyl phosphate, tri-n-butyl phosphate, trioctyl phosphate, triphenyl phosphate, tricresyl phosphate, tris(triethylene glycol) phosphate and ethyldiethyl phosphonoacetate, and acid phosphoric compounds such as methyl acid phosphate, ethyl acid phosphate, isopropyl acid phosphate, butyl acid phosphate, dibutyl phosphate, monobutyl phosphate, dioctyl phosphate and triethylene glycol acid phosphate.

Of these phosphorus compounds, phosphorous acid, orthophosphoric acid, ethyl acid phosphate, tris(triethylene glycol) phosphate, triethylene glycol acid phosphate and ethyldiethyl phosphonoacetate are preferred. From the view point of color tone and suppression of formation of by-products in the polymerization system, ethyl acid phosphate, tris(triethylene glycol) phosphate, triethylene glycol acid phosphate and ethyldiethyl phosphonoacetate are especially preferred.

A phosphorus compound is used in such an amount that the phosphorus atom content in the produced polyester resin will become 0.02 to 4 moles, preferably 0.02 to 2 moles, based on one ton of the polyester resin. The polymerization rate, the color tone of the produced polyester resin and amount of the by-products such as acetaldehyde and cyclic trimers can be adjusted by controlling the amount of the phosphorus compound used.

As at least one compound (2) selected from compounds of Ia-Group metals except for hydrogen, IIa-Group metal compounds and manganese compounds, there can be used, for example, lithium compounds, sodium compounds, potassium compounds, etc., as alkaline metal compound, and magnesium compounds, calcium compounds, etc., as alkaline earth metal compound. These compounds may be used either singly or as a mixture of two or more of them. Especially, magnesium compounds are preferred.

These Ia-Group metals except for hydrogen, IIa-Group metal compounds are preferably those soluble in diols such as ethylene glycol and water and usable in the form of a solution. Such compounds include oxides, hydroxides, alkoxides, acetates, carbonates, oxalates and halides, more specific examples thereof being lithium acetate, sodium acetate, potassium acetate, magnesium oxide, magnesium hydroxide, magnesium alkoxide, magnesium acetate, magnesium carbonate, calcium oxide, calcium hydroxide, calcium acetate, calcium carbonate, manganese oxide, manganese hydroxide and manganese acetate. Magnesium compounds and manganese compounds are preferred, magnesium compounds are especially preferred.

The said at least one compound (2) is used in such an amount that the total content of the metal atoms in the produced polyester resin will become preferably 0.04 to 5 moles, more preferably 0.04 to 3 moles based on one ton of the polyester resin. In case where a magnesium compound is used as the compound (2), the preferred amount thereof (as magnesium metal) is 0.1 to 3 moles, more preferably 0.2 to 2 moles, especially preferably 0.3 to 1 moles, based on one ton of the polyester resin. When the above amount is less than the above mentioned lower limit, the polymerizability thereof may be deteriorated. When the above amount is less than the above mentioned upper limit, the color tone thereof may be deteriorated.

By properly selecting the amounts of the titanium compound and the said metal compounds in the polymerization catalyst, it is possible not only to adjust the polymerization rate in the polymerization reaction but to also control the color tone of the produced polyester resin and formation of by-products such as acetaldehyde and cyclic trimers. In the present invention, it is preferable that the titanium atom content Ti (moles), phosphorus atom content P (moles) and total content M (moles) of Ia-Group metal atoms except for hydrogen, IIa-Group metal atoms and manganese atoms based on one ton of the polyester resin satisfy the relations of the following formulae:

$$P/Ti \geq 1$$

$$1 \geq P/(Ti+M) \geq 0.1$$

$$1 \geq P/M > 0$$

P/Ti is more preferably not less than 5, even more preferably 5 to 50, especially preferably 15 to 30. When P/Ti is less than 1, the produced polyester resin may be a yellowish tinge and is deteriorated in color tone.

The more preferred value of P/(Ti+M) is 0.2 to 1, even more preferably 0.4 to 1. When P/(Ti+M) is less than 0.2, the produced polyester resin has a yellowish tinge and a poor color tone, and when P/(Ti+M) exceeds 1, polymerizability of the resin deteriorates.

P/M is more preferably 0.2 to 1, especially preferably 0.4 to 1. When P/M exceeds 1, polymerizability of the resin may be bad.

Further, the molar ratio (M/Ti) of at least one atom M selected from the group consisting of Ia-Group atoms except for hydrogen, IIa-Group atoms and manganese atom to titanium atom Ti per one ton of the polyester resin of the present invention, is preferably in the range of 2.5 to 250, more preferably 15 to 150, even more preferably 25 to 50.

When the molar ratio M/Ti is less than 2.5, the polymerizability may be deteriorated. When the molar ratio M/Ti is more than 250, the obtained polyester resin tends to be deteriorated in color tone.

The reason that the polyester resin produced by using the catalyst composition satisfying the above defined range has excellent properties, is not clearly understood. However, the reason is considered as follows. When P/Ti is large, deterioration of color tone by Ti (titanium) catalyst and side reaction of forming by-product such as acetaldehyde can be prevented, while the activity of Ti catalyst for polymerization is deteriorated. However, by addition of small amount of "M" (Ia-Group metal atoms except for hydrogen, IIa-Group metal atoms and manganese atoms), unexpectedly, the activity of catalyst for polymerization is enhanced by the effect of "M" as a promoter. Therefore, sufficient activity of catalyst for polymerization can be attained, while maintaining the preventing effect of deterioration of color tone by Ti catalyst and side reaction of forming by-product such as acetaldehyde. In this case, the amount of "M" added is preferably 0.04 to 5 mol based on one ton of the polyester resin as described above. In case of using "M" singly for main polymerization catalyst, the amount of "M" added is usually far more than 5 mol based on one ton of the polyester resin. Therefore, the promoter effect of "M" in combination with Ti catalyst is unexpectedly remarkable. In this case, it is assumed that in order to prevent the deactivation of "M" or titanium catalyst and "M" by "P" (phosphorus atom), P/M or P/(Ti+M) is preferably small amount as described above.

For polymerization of the polyester resin of the present invention, it is possible to use a small quantity of a germanium compound in addition to the said metal compounds (1) and (2). Use of a germanium compound contributes to bettering acetaldehyde content, cyclic trimer content and the color tone of the produced polyester resin. A germanium compound is preferably used in such an amount that the germanium atom content in the produced polyester resin will become 0 to 0.4 mole, preferably 0 to 0.3 mole, more preferably 0 to 0.2 mole, especially preferably 0 to 0.1 mole, based on one ton of the polyester resin. When the amount of germanium compound used is too large, the production cost of polyester may be increased and the obtained molded products may be poor in transparency, as described above.

Specific examples of the germanium compounds may include germanium dioxide, germanium tetraoxide, germanium hydroxide, germanium oxalate, germanium tetraethoxide, germanium tetra-n-butoxide or the like. Among these germanium compounds, germanium dioxide is preferred.

The polyester resin of the present invention may further contain the substances derived from the compounds usually used in production of polyester resins. Examples of such substances are oxides, halides, hydroxides, alkoxides and aliphatic or aromatic carboxylates of zirconium, hafnium, chromium, molybdenum, tungsten, iron, nickel, gold, silver, copper, zinc, boron, aluminum, silicon, tin, lanthanum, cerium and the like.

In the polyester resin of the present invention, other known and commonly used additives such as esterification catalyst, transesterification catalyst, polycondensation catalyst, nucleating agent, inorganic filler, lubricant, slip agent, anti-blocking agent, stabilizer, antistatic agent, antifogging agent, pigment, etc., can be contained within limits not prejudicial to the effect of the present invention.

The polyester resin of the present invention can be produced by going through the steps of preparation of a slurry of starting materials, esterification or transesterification thereof and melt polymerization, and thereafter preferably solid phase polymerization, still further, if necessary, contact treatment with water or water vapor under heating, according to the conventional methods.

First, the aromatic dicarboxylic acid or its ester forming derivative which is the main constituent of the dicarboxylic acid moiety, ethylene glycol which is the main constituent of the diol moiety, other copolymerizable monomer, auxiliaries if required, are stir-mixed to prepare a slurry of starting material. The molar ratio of diol moiety/dicarboxylic acid moiety is usually 1.0 to 1.5 and the molar ratio of diol moiety/dicarboxylic acid's ester forming derivative moiety is usually 1.5 to 2.5

Next, the obtained slurry are subjected to esterification or transesterification to obtain a polyester oligomer.

Esterification is a technique for obtaining a polyester oligomer by carrying out a direct esterification reaction of, for example, terephthalic acid, ethylene glycol or other copolymerization material. Transesterification is a means for obtaining a polyester oligomer by using an ester derivative of a dicarboxylic acid, such as dimethyl terephthalate, instead of a dicarboxylic acid as starting material and conducting a transesterification reaction thereof using a transesterification catalyst in a necessary amount. This transesterification method has a possibility that the transesterification catalyst could exert an adverse effect to the color tone and melt heat stability of the polyester resin.

The esterification method, which requires no transesterification catalyst, has no possibility of adversely affecting the color tone and melt heat stability of the produced polyester resin, so that esterification is preferred for obtaining the polyester resin of the present invention.

When for instance terephthalic acid and ethylene glycol are used as starting materials, esterification is usually carried out by heating at 240 to 280° C. with starring under a pressure of 0 to $4 \times 10^5$ Pa in a relative pressure based on atmospheric pressure for one to 10 hours.

The esterification percentage of resultant low-molecular weight polyester as the esterification or transesterification products (identical to the percentage of carboxyl groups esterified with the diol component based on whole carboxyl groups present in the carboxylic acid component used as a raw material) is preferably not less than 95%.

Then the produced polyester oligomer is polycondensed by melt polymerization. Melt polymerization is carried out by heating the polyester oligomer while gradually reducing pressure in the presence of a polymerization catalyst. For instance, in case of using terephthalic acid and ethylene glycol as starting materials, polymerization is conducted at 250 to 290° C. while gradually reducing pressure from normal pressure till finally reaching 1,333 to 13.3 Pa (approximately 10 to 0.1 Torr). A titanium compound such as mentioned above is used as polymerization catalyst. Its amount used is such that the titanium atom content in the produced polyester resin will become 0.002 to 1.0 mole based on one ton of the polyester resin. If necessary, in addition to a titanium compound, there may also be used (1) a phosphorus compound, (2) at least one of compounds of Ia-Group metals except for hydrogen, IIa-Group metal compounds and manganese compounds, and if necessary, (3) a germanium compound for the catalyst.

These catalyst components may be added at any stage on or prior to the melt polymerization reaction process, but the phosphorus compound is preferably added prior to the addition of other compounds or added together with the other compounds which is first added.

As to the order of addition of these catalyst components, it is preferred to add the phosphorus compound; at least one metal compound selected from the group consisting of compounds of Ia-Group metals except for hydrogen, IIa-Group metal compounds and manganese compounds; and then the titanium compound to the reaction system in this order. When the germanium compound(s) and/or other metal compound is) are used, these compound are add preferably after addition of the phosphorus compound, more preferably on or after of the addition of at least one metal compound selected from the group consisting of compounds of Ia-Group metals except for hydrogen, IIa-Group metal compounds and manganese compounds, especially preferably together with at least one metal compound selected from the group consisting of compounds of Ia-Group metals except for hydrogen, IIa-Group metal compounds and manganese compounds.

By adding these catalyst components in the above-described order, the polyester resin produced by the process of the present invention can exhibit not only good color tone and melt heat-stability but also reduced amount of by-products. Further, in the process of the present invention, by heat-treating the polyester resin obtained after melt-polymerization or solid-phase polymerization in which the catalyst components are added in the above-described order, in water as described hereinafter, it becomes possible to further improve color tone and melt heat-stability thereof and reduce amounts of by-products produced upon molding. In this case, also excellent transparency can be attained.

Further, when the germanium compound(s) are used, usually, the germanium compound(s) are diffuse-volatilized to the out of the polymerization system. However, by adding these catalyst components in the above-described order, the percentage of remaining germanium compound(s) in the polymerization system is enhanced and the productibility is improved by the enhanced using-effect of expensive germanium compound(s).

More specifically, after completion of the direct esterification or transesterification reaction and before initiation of the polycondensation reaction, the phosphorus compound, the at least one metal compound selected from the group consisting of compounds of Ia-Group metals except for hydrogen, IIa-Group metal compounds and manganese compounds, and then the titanium compound may be sequentially added to the reaction vessel in this order at time intervals enough to allow these compounds to sufficiently diffuse therein (for example, every 5 minutes). In particular, it is preferred that the phosphorus compound is added upon preparation of the slurry or initial stage of esterification, and the at least one metal compound selected from the group consisting of compounds of Ia-Group metals except for hydrogen, IIa-Group metal compounds and manganese compounds may be added upon the final stage of esterification, and further, the titanium compound may be added upon the initial stage of polycondensation reaction.

Still further, a method in which a conduit for providing the phosphorus compound, a conduit for providing the at least one metal compound selected from the group consisting of compounds of Ia-Group metals except for hydrogen, IIa-Group metal compounds and manganese compounds and a conduit for providing the titanium compound are attached in this order, to a conduit which transports the esterification product after the esterification, and each compound is added, can be used.

In particular, in the case of continuous production processes, it is preferred that the phosphorus compound is added upon preparation of the slurry, and the at least one metal compound selected from the group consisting of compounds of Ia-Group metals except for hydrogen, IIa-Group metal compounds and manganese compounds, or optionally the germanium compound, and the titanium compound may be added subsequent to the esterification or transesterification reaction. More preferably, the at least one metal compound selected from the group consisting of compounds of Ia-Group metals except for hydrogen, IIa-Group metal compounds and manganese compounds, or optionally the germanium compound may be added upon the esterification or the transesterification reaction, and then the titanium compound may be added to resultant low-molecular weight polyester as the esterification or transesterification product which is transported through a feed conduit to a polycondensation vessel or already introduced into the polycondensation vessel.

The polyester resin obtained from the said melt polymerization is usually melt extruded into a strand, withdrawn from the reactor and cut into granular pieces (chips) by a cutter.

The polyester resin obtained from the said melt polymerization is usually melt extruded into a strand, withdrawn from the reactor and cut into granular pieces (chips) by a cutter.

The polyester resin obtained from the melt polymerization may if necessary be further subjected to solid phase polymerization. This solid phase polymerization is carried out by heating, drying and crystallizing the polyester resin chips, and then subjecting them to polycondensation reaction at a temperature below the melting point under reduced pressure or in an inert gas stream. Since solid phase polymerization is conducted at a lower temperature than melt polymerization, it provides a polyester with an excellent color tone. Also, solid phase polymerization serves for suppressing the amount of by-products such as cyclic oligomers and acetaldehyde. So, it is preferred to be subject to solid phase polymerization.

Heat treatment in the solid phase polymerization operation is usually carried out by maintaining the polyester chips at 60 to 180° C. in order to crystallize and dry in an atmosphere of a dry-state inert gas such as nitrogen, argon, carbon dioxide, etc., or in an atmosphere of water vapor or an inert gas loaded with water vapor, and after crystallizing and drying, keeping the chips at a temperature in the range from melting point of the resin to the melting point thereof temperature minus 80° C. in an inert gas atmosphere for usually not more than 50 hours.

In other embodiment, after the polyester resin granules are subject to a condition of the temperature of 60 to 180° C. under reducing pressure whose absolute pressure is $2.6 \times 10^3$ Pa to crystallize and dry thereof, and subsequently, they are subject to a condition of the temperature of the melting point thereof to the melting point minus 80° C. under the above reducing pressure for not more than 50 hours. In the above embodiments, it is preferred that the content of oxygen in the reaction vessel is not more than 3 ppm, more preferably not more than 1 ppm. When the content of oxygen is large, the color tone of the polyester obtained from the solid phase polymerization may be deteriorated and the acetaldehyde content may be increased. Preferably, solid phase polymerization is conducted while allowing the polyester chips to move flowing by a suitable method such as tumbling or gas fluidized bed process so that the polyester chips won't glue to each other.

The polyester resin obtained after going through melt polymerization or solid phase polymerization as described above is preferably subjected to a contact treatment with water or water vapor under heating (hereinafter referred to as "underwater heat treatment") for the purpose of further improving melt heat stability and further reducing formation of by-products such as acetaldehyde and cyclic trimers in molding. The underwater heat treatment may be performed, for instance, by bringing the chips into contact with water vapor of not lower than 60° C. or a gas loaded with such water vapor for a period of not less than 30 minutes, or by immersing the chips in water of not lower than 40° C. for a period of not less than 10 minutes.

The above production steps may be practiced either batchwise or continuously, but the continuous step is preferred in view of production cost, color tone, transparency and rate of crystallization of the produced resin.

The polyester resin of the present invention may be formed into bottles or the like, for example, by injection-molding the resin into a preform and then subjecting the preform to stretch blow-molding, or by extrusion-molding the resin into a parison and then subjecting the parison to blow-molding; may be formed into trays, containers or the like, for example, by extrusion-molding the resin into a sheet and then subjecting the sheet to thermoforming; or may be formed into films, for example, by biaxially stretching the above sheet. The polyester resin of the present invention is especially useful in applications such as packaging or wrapping materials for foodstuffs or beverages. Among them, the polyester resin of the present invention may be suitably used in forming bottles or containers by injection-molding the resin into a preform and then subjecting the preform to stretch blow-molding in which the preform is biaxially stretched. Examples of such bottles or containers may include those for soda beverages, alcohol beverages or liquid seasonings such as soy sauce, various sauces, sweet sake and dressings. Further, such bottles or containers may be heat-set to form heat-resistant containers suitably used for beverages such as fruit juice, teas and mineral water.

The polyester resin of the present invention obtained by using environmentally safe and inexpensive titanium as a polycondensation catalyst constituent and by selecting the optimal catalyst components and amount thereof and polycondensation conditions has an excellent color tone and melting heat stability, and suppresses formation of by-products such as acetaldehyde and cyclic trimers in production thereof, so that it has the advantage that when it is molded into a food container such as a bottle, the produced bottle won't affect the savor of its content, also staining of the mold is minimized, and the transparency thereof is excellent.

EXAMPLES

The present invention will be described in further detail with reference to the examples thereof, which examples however are merely intended to be illustrative and not to be construed as limiting the scope of the invention. The methods of determinations and evaluations used in the Examples are as described below.

1. Determination of Atom Contents in the Resin 2.5 g of sample resin was ashed and perfectly decomposed by the conventional methods using oxygenated water in the presence of sulfuric acid, and this resin solution was diluted to 50 ml with distilled water and subjected to determination of atoms in the resin by plasma emission spectroscopic analysis using of a JY46P type ICP-AES (high-frequency derive-bonded plasma emission spectroscopic analyzer) manufactured by JOBIN YVON Co., Ltd. The obtained data are converted into mol content (mol/ton) based on one ton of the polyester resin.

Incidentally, in case of using germanium compound(s), the germanium content in the obtained polyester resin (mol/ton) is divided by the initial germanium content added in the production process (mol/ton) thereby calculating the remaining percentage of germanium compound.

2. Intrinsic Viscosity 0.25 g of freeze ground sample resin was dissolved in a phenol/tetrachloroethane (1/1 by weight) mixed solvent at 110° C. for 20 minutes so that the solution would have a concentration (c) of 1.0 g/dl. Relative viscosity ηrel to the solvent was measured by an Ubbellohde capillary tube viscometer at 30° C., from which asp/c (asp: specific viscosity which is equal to ηrel−1; c: concentration) was determined. asp/c when c=0.5, 0.2 and 0.1 g/dl was similarly determined, and from the obtained values, asp/c when concentration c was extrapolated to 0 was determined and expressed as intrinsic viscosity.

3. "b" Value of Hunter's Color Coordinates

Resin granules as a sample (granule weight: 15 to 30 mg) was filled in a 36 mm (inner diameter)×15 mm (depth) measuring cell (its light receiving portion being made of quartz glass) flush with the brim, and by using a colorimetric color difference meter 300A mfd. by Nippon Denshoku Kogyo KK, Hunter's b value was measured four times by the reflection method turning the cell to change its direction 90° each time, and the simple mean of the four determinations was expressed as "b" value. Before conducting the measurement, the apparatus was left connected to the power source for more than 4 hours to have it well stabilized.

4. Acetaldehyde Content

Precisely weighed 5.0 g of resin granules (granule weight: 15 to 30 mg) as a sample was put into a 50 ml microbomb together with 10.0 ml of pure water. After closing the bomb airtight under nitrogen sealing, it was heated at 160° C. for 2 hours and acetaldehyde in the resin was extracted into water. The amount of acetaldehyde in the extract was determined by a gas chromatograph GC-14A mfd. by Shimadzu Corp. with isobutyl alcohol as an internal standard.

5. Cyclic Trimer Content

Precisely weighed 4.0 mg of sample resin was dissolved in 2 ml of a chloroform/hexafluoroisopropanol (3/2 by volume) mixed solvent, and the solution was diluted by adding 20 ml of chloroform. Then 10 ml of methanol was added to reprecipitate the sample, and the solution was filtered. The filtrate was evaporated to dryness and the residue was dissolved in 25 ml of dimethylformamide. The amount of the cyclic trimer (cyclotriethylene terephthalate) in the solution was determined by liquid gas chromatograph LC-10A mfd. by Shimadzu Corp.

6. Evaluation of Molded Product after Injection Molding at 280° C.

After dried in an inert oven (IPHH-201 mfd. by ESPEC Co., Ltd.) in a nitrogen stream of 40 l/min at 160° C. for 4 hours, the sample resin was injection molded by an injection molding machine (M-70A11-DM mfd. by Meiki Seisakusho KK) under the conditions of: cylinder temperature (Set)= 280° C.; back pressure=5×10$^5$ Pa; injection rate=40 cc/sec; dwell pressure=35×10$^5$ Pa; mold temperature=25° C.; molding cycle=about 75 seconds, to obtain a stepped molded plate of the configuration shown in FIG. 1 having a size of 50 mm by 100 mm with thickness varying stepwise in 6 portions from 6 mm to 3.5 mm sideways with a level difference of 0.5 mm. In FIG. 1, letter G denotes the gate.

The cyclic trimer content, crystallizing temperature in temperature lowering mode, acetaldehyde content and haze (for determining transparency) of the molded plate were measured by the methods shown below.

(1) Cyclic Trimer Content (CTS)

This was measured by the same method as described above using a sample cut out from the foremost end portion (portion A in FIG. 1) of the 3.5 mm thick section of the molded plate.

(2) Crystallizing Temperature in Temperature Lowering Mode

The foremost end portion (portion A in FIG. 1) of the 3.5 mm thick section of the molded plate was cut out and dried by a vacuum dryer at 40° C. for 3 days, and a sample was sliced out from its non-surface portion. Approximately 10 mg of the sample was weighed out, put into an open aluminum pan (P/N SSC000E030 mfd. by Seiko Electronic Co., Ltd, normal pressure type), and closed up by placing its cover (P/N SSC000E032 by Seiko Electronic Co., Ltd., normal pressure type) in position. Then, using a differential scanning calorimeter (DSC220C mfd. by Seiko Co., Ltd.), the sample was heated from 20° C. to 285° C. at a rate of 20° C./min in a nitrogen stream, maintained in the molten state at 285° C. for 3 minutes and then cooled down to 20° C. at a rate of 10° C./min, and the peak temperature of crystallization observed in the course of temperature descent was measured.

(3) Acetaldehyde Content (AAS)

This was measured by the above-described method, using a sample cut out to a size of about 4 mm square from the rear end portion (portion B in FIG. 1) of the 3.5 mm thick and 4.0 mm thick sections of the molded plate and made into chips.

(4) Transparency

Haze of the 5.0 mm thick portion (portion C in FIG. 1) of the molded plate was measured by a hazemeter (NDH-300A mfd. by Nippon Denshoku KK).

A 5.0 mm-thick portion (C portion in FIG. 1) of the same molded plate as obtained above was visually observed to evaluate a transparency thereof. The results of the evaluation are classified into the following three ranks.

A: Considerably high, excellent transparency;

B: Good transparency; and

C: Low transparency with cloudiness

7. Evaluation of Molding for a Bottle

Resin granules as a sample (granule weight: 15 to 30 mg) were dried at 130° C. for 10 hours using a vacuum dryer, and then injection-molded into a preform of a test tube-like shape having an outer diameter of 29.0 mm, a height of 165 mm, an average thickness of 3.7 mm and a weight of 60 g, using an injection-molding machine ("FE-80S" manufactured by Nissei Jushi Kogyo Co., Ltd.) which was operated at a cylinder temperature (SET) of 280° C., a back pressure of $5 \times 10^5$ Pa, an injection rate of 45 cc/sec., a dwell pressure of $30 \times 10^5$ Pa, a mold temperature of 20° C. and a molding cycle of about 40 seconds. The thus obtained preform was heated within a near-infrared irradiation oven with a quartz heater for 70 seconds, and then allowed to stand at room temperature for 25 seconds. Thereafter, the preform was placed in a blowing mold set at 160° C., blow-molded therein at a blow pressure of $7 \times 10^5$ Pa for one second and further at a blow pressure of $30 \times 10^5$ Pa for 40 seconds while stretching the preform in the longitudinal direction by a stretching rod, heat-set and then air-cooled to produce 500 bottles each having an outer diameter of about 95 mm, a height of about 305 mm, an average cylinder thickness of 0.37 mm, a weight of about 60 g and a capacity of about 1.5 liters. A surface of a cylinder portion of the obtained 500th bottle was visually observed to evaluate a mold-contamination property thereof according to the following criteria.

A: Smooth surface, and no abnormalities were caused;

B: Slightly deteriorated in surface smoothness, but practically usable; and

C: Rough surface, and adhesion of foreign materials thereonto was recognized.

The smell of acetaldehyde and color tone of the obtained bottles were evaluated by the following methods.

(1) Smell of Acetaldehyde

Each bottle sealed airtightly by a cap was heated in an oven at 50° C. for one hour and then taken out from the oven, and the smell of acetaldehyde in the inside of bottle was evaluated by an organoleptic test. A: There was little smell of acetaldehyde; B: There was only a small degree of smell of acetaldehyde; C: There was a disgusting smell of acetaldehyde.

(2) Color Tone

Color tone of the mouth portion of each obtained bottle was visually evaluated. A: The mouth portion was colorless; B: The mouth portion assumed a slightly yellowish tinge, but there was practically no problem; C: The mouth portion was visibly tinged with yellow.

Example 1

A polyester resin was produced from the following process using batch type polymerization equipment comprising one slurry tank, one esterification tank and one melt polymerization tank.

A slurry of starting materials comprising 43 kg (260 mol) of terephthalic acid and 19 kg (312 mol) of ethylene glycol was prepared in the slurry tank. This slurry of starting materials was successively supplied, over a period of 4 hours, into the esterification tank already containing approximately 60 kg of bishydroxyethyl terephthalate and maintained at 250° C. under $1.2 \times 10^5$ Pa. After the completion of supply of the slurry, the esterification reaction was allowed to proceed for additional one hour, and the obtained esterified product was transferred into the melt polymerization tank. Then, from a pipe connected to the melt polymerization tank, ethyl acid phosphate, magnesium acetate and tetra-n-butyltitanate were added successively as an ethylene glycol solution at intervals of 5 minutes. These catalyst components were used in such amounts that the contents of P, Mg and Ti in the produced resin would become 0.840 moles, 1.974 moles and 0.021 moles, respectively, based on one ton of the resin.

The system was heated from 250° C. to 280° C. over a period of 2.5 hours while reducing the pressure from normal pressure to $4.0 \times 10^2$ Pa (absolute pressure) in 60 minutes, and with the reduced pressure maintained, melt polymerization reaction was allowed to carry on for a sufficient period of time for the produced resin to have an intrinsic viscosity ($\eta_1$) of 0.55. The produced resin was withdrawn as a strand from a discharge port at the bottom of the reactor, then cooled with water and cut into chips, thus obtaining approximately 50 kg of a melt polymerized polyester resin with an intrinsic viscosity ($\eta_1$) of 0.55 dl/g.

The thus obtained melt polymerized polyester resin was continuously supplied into a stirring/crystallizing apparatus maintained at about 160° C. so that the residence time would become about 5 minutes, and thereby crystallized.

The crystallized resin was dried in an inert oven IPHH-201 mfd. by ESPEC Co., Ltd. in a nitrogen stream of 40 L/min at 160° C. for 2 hours, and then heated at 210° C. for a time sufficient to provide an intrinsic viscosity of 0.753 dl/g, thereby to effectuate solid phase polymerization.

The properties and results of evaluation of the obtained polyester resin are shown in Table 1.

Examples 2 and 3

The same procedure as defined in Example 1 was conducted except for the alterations shown in Table 1 to obtain polyester resins. The properties and results of evaluation of the obtained polyester resins are shown in Table 1.

Examples 4 to 7

The same procedure as defined in Example 1 was conducted except for the alterations shown in Table 1 and adding ethyl acid phosphate, magnesium acetate, tetra-n-butyltitanate and germanium dioxide successively as an ethylene glycol solution at intervals of 5 minutes through a conduit attached to the reaction vessel to obtain polyester resins. The properties and results of evaluation of the obtained polyester resins are shown in Table 1.

Example 8

The polyester resin obtained in Example 4 was subject to the underwater heat treatment at 90° C. for 4 hours. The properties and results of evaluation of the obtained polyester resins are shown in Table 1.

Comparative Examples 1 to 5

The same procedure as defined in Example 1 was conducted except for using and adding the catalyst and phosphorus compound at intervals of 5 minutes in order as shown in Table 1 to obtain polyester resins. The properties and results of evaluation of the obtained polyester resins are shown in Table 1.

TABLE 1

|  | Example 1 | Example 2 | Example 3 |
|---|---|---|---|
| Metal atoms |  |  |  |
| Titanium atom (Ti) (mol/t) | 0.021 | 0.021 | 0.042 |
| Phosphorus atom (P) (mol/t) | 0.840 | 0.840 | 0.840 |
| Magnesium atom (Mg) (mol/t) | 4.031 | 1.974 | 1.481 |
| Germanium atom (Ge) (mol/t) | — | — | — |
| Antimony atom (Sb) (mol/t) | — | — | — |
| P/Ti (mol/mol) | 40.2 | 40.2 | 20.1 |
| P/M (mol/mol) | 0.21 | 0.43 | 0.57 |
| P/(Ti + M) (mol/mol) | 0.21 | 0.42 | 0.55 |
| M/Ti (mol/mol) | 193 | 95 | 35 |
| Order of addition | P → Mg → Ti | P → Mg → Ti | P → Mg → Ti |
| Percentage of remaining Ge atom (%) | — | — | — |
| Intrinsic viscosity [η] (dl/g) | 0.745 | 0.753 | 0.753 |
| Color coordinates b | 3.2 | 2.2 | 3.8 |
| Acetaldehyde (AAo) (ppm) | 4.8 | 3.2 | 3.9 |
| Cyclic trimer (CTo) (wt %) | 0.46 | 0.49 | 0.43 |
| Stepped molded plate |  |  |  |
| Cyclic trimer (CTs) (wt %) | 0.48 | 0.50 | 0.47 |
| CTs-CTo (wt %) | 0.02 | 0.01 | 0.04 |
| Crystallizing temperature in temperature lowering mode (° C.) | 171 | 170 | 170 |
| AAs (ppm) | 29.1 | 22.5 | 30.2 |
| AAs-AAo (ppm) | 24.3 | 19.3 | 26.3 |
| Transparency Haze (%) | 3.5 | 3.2 | 3.3 |
| Transparency Visual | A | A | A |
| Bottle |  |  |  |
| Color tone | B | A | B |
| Smell of aldehyde | B | B | B |
| Staining of mold | A | A | B |

|  | Example 4 | Example 5 | Example 6 |
|---|---|---|---|
| Metal atoms |  |  |  |
| Titanium atom (Ti) (mol/t) | 0.021 | 0.021 | 0.042 |
| Phosphorus atom (P) (mol/t) | 0.420 | 0.420 | 0.420 |

TABLE 1-continued

| Magnesium atom (Mg) (mol/t) | 0.740 | 1.481 | 1.522 |
|---|---|---|---|
| Germanium atom (Ge) (mol/t) | 0.207 | 0.275 | 0.234 |
| Antimony atom (Sb) (mol/t) |  |  |  |
| P/Ti (mol/mol) | 20.1 | 20.1 | 10.0 |
| P/M (mol/mol) | 0.57 | 0.28 | 0.28 |
| P/(Ti + M) (mol/mol) | 0.55 | 0.28 | 0.27 |
| M/Ti (mol/mol) | 35 | 71 | 36 |
| Order of addition | P → Mg → Ti → Ge | P → Mg → Ti → Ge | P → Mg → Ti → Ge |
| Percentage of remaining Ge atom (%) | 54 | 57 | 56 |
| Intrinsic viscosity [η] (dl/g) | 0.766 | 0.830 | 0.767 |
| Color coordinates b | 2.1 | 3.0 | 3.2 |
| Acetaldehyde (AAo) (ppm) | 2.2 | 1.7 | 1.7 |
| Cyclic trimer (CTo) (wt %) | 0.35 | 0.43 | 0.48 |
| Stepped molded plate |  |  |  |
| Cyclic trimer (CTs) (wt %) | 0.41 | 0.50 | 0.56 |
| CTs-CTo (wt %) | 0.06 | 0.07 | 0.08 |
| Crystallizing temperature in temperature lowering mode (° C.) | 178 | 177 | 177 |
| AAs (ppm) | 17.9 | 21.5 | 23.6 |
| AAs-AAo (ppm) | 15.7 | 19.8 | 21.9 |
| Transparency Haze (%) | 5.8 | 5.4 | 5.5 |
| Transparency Visual | B | B | B |
| Bottle |  |  |  |
| Color tone | A | B | B |
| Smell of aldehyde | B | B | B |
| Staining of mold | B | B | B |

|  | Example 7 | Example 8 |
|---|---|---|
| Metal atoms |  |  |
| Titanium atom (Ti) (mol/t) | 0.104 | 0.021 |
| Phosphorus atom (P) (mol/t) | 0.420 | 0.420 |
| Magnesium atom (Mg) (mol/t) | 1.399 | 0.740 |
| Germanium atom (Ge) (mol/t) | 0.207 | 0.207 |
| Antimony atom (Sb) (mol/t) |  |  |
| P/Ti (mol/mol) | 4.0 | 20.1 |
| P/M (mol/mol) | 0.30 | 0.57 |
| P/(Ti + M) (mol/mol) | 0.28 | 0.55 |
| M/Ti (mol/mol) | 13 | 35 |
| Order of addition | P → Mg → Ti → Ge | P → Mg → Ti → Ge |
| Percentage of remaining Ge atom (%) | 59 | 54 |
| Intrinsic viscosity [η] (dl/g) | 0.762 | 0.758 |
| Color coordinates b | 3.8 | 1.9 |
| Acetaldehyde (AAo) (ppm) | 3.5 | 1.5 |
| Cyclic trimer (CTo) (wt %) | 0.34 | 0.35 |
| Stepped molded plate |  |  |
| Cyclic trimer (CTs) (wt %) | 0.43 | 0.37 |
| CTs-CTo (wt %) | 0.09 | 0.02 |
| Crystallizing temperature in temperature lowering mode (° C.) | 179 | 173 |
| AAs (ppm) | 25.6 | 16.4 |
| AAs-AAo (ppm) | 22.1 | 14.9 |
| Transparency Haze (%) | 6.3 | 6.4 |
| Transparency Visual | B | B |
| Bottle |  |  |
| Color tone | B | A |
| Smell of aldehyde | B | A |
| Staining of mold | B | A |

|  | Comp. Example 1 | Comp. Example 2 | Comp. Example 3 |
|---|---|---|---|
| Metal atoms |  |  |  |
| Titanium atom (Ti) (mol/t) | — | — | — |
| Phosphorus atom (P) (mol/t) | 2.906 | 0.969 | 0.969 |
| Magnesium atom (Mg) (mol/t) | 2.057 | — | — |
| Germanium atom (Ge) (mol/t) | — | 0.551 | 0.551 |

TABLE 1-continued

|  |  |  |  |
|---|---|---|---|
| Antimony atom (Sb) (mol/t) | 1.372 | — | — |
| P/Ti (mol/mol) | — | — | — |
| P/M (mol/mol) | 1.41 | — | — |
| P/(Ti + M) (mol/mol) | — | — | — |
| M/Ti (mol/mol) | — | — | — |
| Order of addition | P → Mg → Sb | P → Ge | P → Ge |
| Intrinsic Viscosity [η] (dl/g) | 0.782 | 0.756 | 0.756 |
| Color coordinates b | 0.8 | 0.9 | 1.2 |
| Acetaldehyde (AAo) (ppm) | 3.8 | 3.4 | 2.6 |
| Cyclic trimer (CTo) (wt %) | 0.40 | 0.32 | 0.32 |
| Stepped molded plate |  |  |  |
| Cyclic trimer (CTs) (wt %) | 0.42 | 0.45 | 0.33 |
| CTs-CTo (wt %) | 0.02 | 0.13 | 0.01 |
| Crystallizing temperature in temperature lowering mode (° C.) | 182 | 179 | 183 |
| AAs (ppm) | 17.0 | 15.4 | 14.4 |
| AAs-AAo (ppm) | 13.2 | 12.0 | 11.8 |
| Transparency Haze (%) | 16.0 | 6.2 | 16.0 |
| Transparency Visual | C | B | C |
| Bottle |  |  |  |
| Color tone | A | A | A |
| Smell of aldehyde | A | A | A |
| Staining of mold | A | C | A |

|  | Comp. Example 4 | Comp. Example 5 |
|---|---|---|
| Metal atoms |  |  |
| Titanium atom (Ti) (mol/t) | 1.086 | 0.063 |
| Phosphorus atom (P) (mol/t) | 0.549 | 0.065 |
| Magnesium atom (Mg) (mol/t) | 2.180 | — |
| Germanium atom (Ge) (mol/t) | — | — |
| Antimony atom (Sb) (mol/t) | — | — |
| P/Ti (mol/mol) | 0.5 | 1.0 |
| P/M (mol/mol) | 0.25 | — |
| P/(Ti + M) (mol/mol) | 0.17 | — |
| M/Ti (mol/mol) | 2 | — |
| Order of addition | Ti → Mg → P | P → Ti |
| Intrinsic viscosity [η] (dl/g) | 0.747 | 0.766 |
| Color coordinates b | 14.3 | 5.1 |
| Acetaldehyde (AAo) (ppm) | 7.5 | 6.1 |
| Cyclic trimer (CTO) (wt %) | 0.34 | 0.36 |
| Stepped molded plate |  |  |
| Cyclic trimer (CTs) (wt %) | 0.52 | 0.47 |
| CTs-CTo (wt %) | 0.18 | 0.11 |
| Crystallizing temperature in temperature lowering mode (° C.) | 185 | 175 |
| AAs (ppm) | 35.5 | 28.5 |
| AAs-AAo (ppm) | 28.0 | 22.4 |
| Transparency Haze (%) | 16.5 | 4.0 |
| Transparency Visual | C | B |
| Bottle |  |  |
| Color tone | C | C |
| Smell of aldehyde | C | C |
| Staining of mold | C | C |

Examples 9 to 11

The same procedure as defined in Example 1 was conducted except for the alterations shown in Table 1 and adding (1) ethyl acid phosphate ethylene glycol solution, (2) magnesium acetate ethylene glycol solution and germanium dioxide ethylene glycol solution, and (3) tetra-n-butyltitanate ethylene glycol solution were successively added at intervals of 5 minutes through a conduit attached to the reaction vessel to obtain melt polymerized polyester resins.

The obtained melt polymerized polyester resin was transferred into a double-corn rotary type solid phase polymerization tank having a volume capacity of 100 L. The content in the tank was subject to a reducing pressure of $1.3 \times 10^2$ Pa (absolute pressure) and thereafter returning to the atmospheric pressure by introducing nitrogen gas (the oxygen content: 2 ppm). This operation was repeated three times and nitrogen gas substitution thereto was conducted. Again, the content in the tank was subject to a reducing pressure of $1.3 \times 10^2$ Pa (absolute pressure, theoretical oxygen content: 2 ppb). The content was heated from the room temperature to 215° C. over a period of 18 hours while the tank was revolved at 30 rpm to crystallize the resin. Subsequently, the solid phase polymerization was conducted under the reducing pressure of $1.3 \times 10^2$ Pa (absolute pressure) at 215° C. The properties and results of evaluation of the obtained polyester resin are shown in Table 2.

TABLE 2

|  | Example 9 | Example 10 | Example 11 |
|---|---|---|---|
| Composition of starting material |  |  |  |
| Dicarboxylic acid moiety TPA (mol %) | 100 | 100 | 100 |
| Diol moiety EG (mol %) | 97.7 | 97.7 | 97.7 |
| DEG (mol %) | 2.3 | 2.3 | 2.3 |
| Metal atoms |  |  |  |
| Titanium atom (Ti) (mol/t) | 0.021 | 0.021 | 0.021 |
| Phosphorus atom (P) (mol/t) | 0.420 | 0.420 | 0.420 |
| Magnesium atom (Mg) (mol/t) | 0.740 | 1.481 | 0.740 |
| Germanium atom (Ge) (mol/t) | 0.207 | 0.275 | 0.207 |
| Antimony atom (Sb) (mol/t) |  |  |  |
| P/Ti (mol/mol) | 20.1 | 20.1 | 20.1 |
| P/M (mol/mol) | 0.57 | 0.28 | 0.57 |
| P/(Ti + M) (mol/mol) | 0.55 | 0.28 | 0.55 |
| M/Ti (mol/mol) | 35 | 71 | 35 |
| Order of addition | P → (Mg + Ge) → Ti | P → (Mg + Ge) → Ti | P → (Mg + Ge) → Ti |
| Percentage of remaining Ge atom (%) | 58 | 61 | 58 |
| Intrinsic viscosity [η] (dl/g) | 0.757 | 0.819 | 0.757 |
| Color coordinates b | 0.7 | 1.8 | 0.5 |
| Acetaldehyde (AAo) (ppm) | 2.0 | 1.5 | 1.1 |
| Cyclic trimer (CTO) (wt %) | 0.35 | 0.43 | 0.35 |
| Stepped molded plate |  |  |  |
| Cyclic trimer (CTs) (wt %) | 0.40 | 0.50 | 0.38 |
| CTs-CTo (wt %) | 0.05 | 0.07 | 0.03 |
| AAs (ppm) | 18.2 | 20.6 | 16.4 |
| AAs-AAo (ppm) | 16.2 | 19.1 | 15.3 |
| Bottle |  |  |  |
| Color tone | A | B | A |
| Smell of aldehyde | B | B | A |
| Staining of mold | B | B | A |

What is claimed is:

1. A polyester resin produced by polymerizing a dicarboxylic acid component comprising mainly an aromatic dicarboxylic acid or its ester forming derivative, and a diol component comprising mainly ethylene glycol in the presence of a catalyst containing a titanium compound, which polyester resin contains titanium atoms (Ti) in an amount of 0.002 to 1.0 mole based on one ton of the polyester resin and has the following properties:

Intrinsic viscosity ([η], dl/g) ≧ 0.70

Hunter's "b" value ≦ 4

Acetaldehyde content ($AA_0$, ppm) ≦ 5.0.

2. A polyester resin according to claim 1, wherein a cyclic trimer content ($CT_0$, wt %) in said resin is not more than 0.50 wt %.

3. A polyester resin according to claim 1, wherein the difference between the cyclic trimer content ($CT_S$, wt %) of the resin in the molded product after injection molding at 280° C. and the cyclic trimer content ($CT_0$, wt %) of the resin before injection molding ($CT_S-CT_0$) is not more than 0.10 wt %.

4. A polyester resin according to claim 3, wherein the crystallizing temperature in temperature lowering mode of the resin in the molded product after injection molding at 280° C. is not higher than 180° C.

5. A polyester resin according to claim 1, wherein the difference between the acetaldehyde content ($AA_s$, ppm) of the resin in the molded product after injection molding at 280° C. and the acetaldehyde content ($AA_0$, ppm) of the resin before injection molding ($AA_s-AA_0$) is not more than 20 ppm.

6. A polyester resin according to claim 1, said polyester resin containing 0.02 to 4 moles of phosphorus atoms based on one ton of the polyester resin, and also containing compounds of Ia-Group atom(s) except for hydrogen, IIa-Group atom(s) and manganese atoms in a total amount of 0.04 to 5 moles based on one ton of the polyester resin.

7. A polyester resin according to claim 1, wherein the titanium atom content Ti (moles) and phosphorus atom content P (moles) based on one ton of the polyester resin, and the total content M (moles) of Ia-Group atom(s) except for hydrogen, IIa-Group atom(s) and manganese atoms have the relations defined by the following formulae:

$$P/Ti \geq 1$$

$$1 \geq P/(Ti+M) \geq 0.1$$

$$1 \geq P/M > 0$$

8. A polyester resin according to claim 1, wherein the titanium atom content Ti (moles) based on one ton of the polyester resin and the total content M (moles) of Ia-Group atom(s) except for hydrogen, IIa-Group atom(s) and manganese atoms have the relations defined by the following formulae:

$$2.5 \leq M/Ti \leq 250$$

9. A polyester resin according to claim 1, said polyester resin containing germanium atoms in an amount of 0 to 0.4 moles based on one ton of the polyester resin.

10. A polyester resin according to claim 1, wherein not less than 95 mol % of the dicarboxylic acid component is terephthalic acid or 2,6-naphthalenedicarboxylic acid, and not less than 95 mol % of the diol component is ethylene glycol.

11. A polyester resin according to claim 1, said polyester resin being produced by esterifying a dicarboxylic acid component comprising mainly an aromatic dicarboxylic acid with a diol component comprising mainly ethylene glycol, and then polymerizing the esterified product in the presence of a titanium compound, a phosphorus compound and a compound of at least one metal selected from Ia-Group metals except for hydrogen, IIa-Group metal compounds and manganese compounds.

12. A polyester resin according to claim 1, which contains no antimony and cobalt atoms.

13. A polyester hollow container molded by using a polyester resin set forth in any one of claims 1 to 12.

14. A process for producing a polyester resin which comprises polymerizing a dicarboxylic acid component comprising mainly an aromatic dicarboxylic acid and a diol component comprising mainly ethylene glycol in the presence of a catalyst containing (1) a titanium compound, (2) a phosphorus compound and (3) at least one compound selected from compounds of Ia-Group metals except for hydrogen, IIa-Group metal compounds and manganese compounds, said compounds (1) to (3) being added to the reaction system in the order of (2), (3) and (1).

15. The process according to claim 14, wherein a germanium compound is additionally used as the catalyst, said compound being added at any pertinent stage after addition of the phosphorus compound (2).

16. The process according to claim 14, wherein the polyester resin produced by polymerization is brought into contact with water or water vapor under heating.

17. The process according to claim 14, wherein the polymerization is carried out in the presence of a titanium compound of an amount that will make the titanium atom content 0.002 to 1.0 mole based on one ton of the polyester resin yield.

18. The process according to claim 14, wherein the polymerization is carried out in the presence of (i) a phosphorus compound of an amount that will make the phosphorus atom content 0.02 to 4 moles based on one ton of the polyester resin yield, and (ii) a metal compound of an amount that will make the total content of the Ia-Group atom(s) except for hydrogen, IIa-Group atom(s) and manganese atoms 0.04 to 5 moles.

19. The process according to claim 14, wherein (1) a titanium compound, (2) a phosphorus compound and (3) at least one compound selected from Ia-Group metal compounds except for hydrogen, IIa-Group metal compounds and manganese compound are added so that the titanium atom content Ti (moles) and phosphorus atom content P (moles) based on one ton of the polyester resin yield, and the total content M (moles) of the Ia-Group atom(s) except for hydrogen, IIa-Group atom(s) and manganese atoms will satisfy the relations of the following formulae:

$$P/Ti \geq 1$$

$$1 \geq P/(Ti+M) \geq 0.1$$

$$1 \geq P/M > 0$$

20. The process according to claim 14, wherein the polymerization is carried out in the presence of a germanium compound of an amount which will make the germanium atom content 0 to 0.4 mole based on one ton of the polyester resin yield.

21. The process according to claims 14, wherein not less than 95 mol % of the dicarboxylic acid moiety is terephthalic acid or 2,6-naphthalenedicarboxylic acid, and not less than 95 mol % of the diol moiety is ethylene glycol.

* * * * *